(12) United States Patent
Kimura

(10) Patent No.: US 7,024,094 B2
(45) Date of Patent: Apr. 4, 2006

(54) DISPLAY UNIT

(75) Inventor: Mitsuteru Kimura, Miyagi (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/505,647

(22) PCT Filed: Feb. 20, 2003

(86) PCT No.: PCT/JP03/01867

§ 371 (c)(1),
(2), (4) Date: Aug. 20, 2004

(87) PCT Pub. No.: WO03/071341

PCT Pub. Date: Aug. 28, 2003

(65) Prior Publication Data

US 2005/0123265 A1    Jun. 9, 2005

(30) Foreign Application Priority Data

Feb. 22, 2002  (JP) .............................. 2002-046876

(51) Int. Cl.
*G02B 6/00* (2006.01)
(52) U.S. Cl. ...................................... 385/147; 385/129
(58) Field of Classification Search ................ 385/147, 385/129–132
See application file for complete search history.

(56) References Cited

U.S. PATENT DOCUMENTS

| 5,596,671 | A * | 1/1997 | Rockwell, III ............... 385/147 |
| 6,236,799 | B1 | 5/2001 | Huh et al. |
| 2002/0018628 | A1 | 2/2002 | Kim et al. |
| 2003/0026564 | A1 * | 2/2003 | Takeuchi et al. ............ 385/120 |

FOREIGN PATENT DOCUMENTS

| EP | 399506 A | 11/1990 |
| EP | 823587 A | 2/1998 |
| JP | 07-287176 A | 10/1995 |
| JP | 08-021966 A | 1/1996 |
| JP | 10-78549 A | 3/1998 |
| JP | 10-133591 A | 5/1998 |
| JP | 11-073142 A | 3/1999 |
| JP | 11-109349 A | 4/1999 |
| JP | 11-109397 A | 4/1999 |

(Continued)

OTHER PUBLICATIONS

International Serach Report for PCT/JP03/01867, mailed Jun. 3, 2003.

*Primary Examiner*—Sung Pak
(74) *Attorney, Agent, or Firm*—Jeffrey L. Thompson; Thompson & Thompson, P.A.

(57) ABSTRACT

A display unit comprising a board (10), a three-primary color-independent optical waveguide (100) arranged and formed on one side thereof, and a transparent electrode (30) and an electrode (40) serving as counter electrodes arranged and formed to sandwich an electric field reaction material (20) formed on one of two optical waveguides constituting the optical waveguide (100) and being transparent to waveguide light, wherein part of the waveguide light is allowed to pass at least the field reaction material (20), and a voltage applied between these counter electrodes changes the shape of the reaction material (20) to scatter the waveguide light and form pixels in to a displayed image, whereby the device is free from a mechanical drive unit, high in reliability, quality, brightness and response speed, low in power consumption and cost, and capable of full color displaying.

20 Claims, 9 Drawing Sheets

FOREIGN PATENT DOCUMENTS

| | | |
|---|---|---|
| JP | 2000-075223 A | 3/2000 |
| JP | 2000-172197 A | 6/2000 |
| JP | 2000-258701 A | 9/2000 |
| JP | 2000-330040 A | 11/2000 |
| JP | 2001-021853 A | 1/2001 |
| JP | 2001-034537 A | 2/2001 |
| JP | 2001-042329 A | 2/2001 |
| JP | 2002-029594 A | 1/2002 |
| JP | 2002-031781 A1 | 1/2002 |
| JP | 2002-040339 A1 | 2/2002 |
| JP | 2003-172888 A1 | 6/2003 |

* cited by examiner (a)

(b)

(a)

(b)

(a)

(b)

DISPLAY UNIT

TECHNICAL FIELD

This invention relates to a display device featuring very bright, thin and small-to-large screens, low power consumption and high-speed response. It relates especially to a display device that produces an image by scattering guided light by diffusing, expanding, shrinking, deforming, or coloring transparent electroresponsive material contained between paired electrodes by applying a voltage between the electrodes at points corresponding to specific pixels.

BACKGROUND OF THE INVENTION

Conventional thin display devices display images by adjusting the light leaking from the optical waveguide by controlling the contact and separation of the displacement transmission unit with and from the optical waveguide using a piezoelectric actuator (see Japanese Laid-Open Patent Publication Nos. H7-287176, H10-78549 and H11-73142). Also, there are conventionally proposed systems that leaked evanescent waves by bringing a reflection prism, an extraction unit driven by static electricity, close to the optical waveguide (see Japanese Laid-Open Patent Publication Nos. 2000-75223, 2000-258701 and 2000-330040).

Also an optical switch has been proposed by this inventor that leaks guided light by attracting a cantilever film to the optical waveguide by electrostatic drive (see Japanese Laid-Open Patent Publication Nos. 2001-304537 and 2002-029594).

Additionally, there are conventionally used display units that emit the light, as pixels, from a back light through a filter of three primary colors of light and a polarizer using liquid crystal as the optical shutter. Other conventionally used display devices display pixels by scattering the guided light reflected at the intersurfaces of the glass plates using light-scattering liquid crystal. Liquid crystal is sealed between two glass plates to comprise the optical waveguide (see Japanese Laid-Open Patent Publication No. H11-109349).

Also available were display devices capable of full-color display of light in three primary colors, which is propagated through an optical waveguide, through changes in the refractive index at an optical output unit provided in the optical waveguide (see Japanese Laid-Open Patent Publication 2000-172197 and U.S. Pat. No. 6,236,799).

However, a problem with the conventional displacement transmission unit driven by a piezoelectric actuator was the thick piezoelectric element needed to transmit a large displacement, resulting in large mass, requiring large drive power, and producing slow response. The system with the reflection prism, an electrostatic extraction unit, located close to the optical waveguide has a problem in that its reflection prism has to have a large mass and is unable to provide high-speed response. Further, the electrodes to drive the extraction unit by static electricity are almost parallel to each other and are located at a distance through a support, thus requiring large voltage for attraction. Also, the optical switch to leak the guided light by attracting the cantilever thin film to the optical waveguide by static electricity has a problem in that it needs high voltage for attraction because the cantilever film is isolated from the optical waveguide. Additionally, the system that uses light leakage through the contact part of the above-mentioned optical waveguide and drive unit has its problems. It is unreliable due to fatigue of its mechanical drive unit, has unexpected scattering of the guided light due to foreign matter such as dust sticking to the core of the optical waveguide which is exposed to the air, and its contact part must be a thick and heavy drive unit to ensure large leakage of the guided light and pixels with sufficient brightness. For the above reasons, the advent of reliable (with no mechanical drive unit if possible), bright, highly responsive, and less power-consuming display devices has been anticipated.

A conventional display system using liquid crystal as the optical shutter has the following problems. It is difficult to see clearly: it varies greatly depending on the viewing angle because the system emits the light from the back light through the liquid crystal and uses a polarizer. Further, it is difficult to produce in thin configurations because it has a complex structure comprising a color filter and polarizer, and thus has is also expensive.

A display system that seals the light-scattering liquid crystal between two glass plates as the optical waveguide is reliable because it has no mechanical drive unit, but its optical waveguide is two glass plates with liquid crystal held in between them. It has the following four problems.

First, because its optical waveguide is exposed, foreign matter such as dust sticks to its surface, causing the guided light to leak and degrade the quality of the image second, the two glass plates, which are used also as the optical waveguide, are the supporting materials and have to be thick. Thus, it is difficult to form a thin and precise optical waveguide. Third, instead of miniaturizing the optical waveguide, the light of the three primary colors is guided through the same optical waveguide, and each pixel is set to scattering mode synchronously with the light emission, so that the light of the three primary colors can use the liquid crystal pixel of one point for full-color display. This system needs only one third of the pixels that the conventional method needs. But, brightness is necessary to see an image. The shining of one pixel for an instant is too dark. Flickering is large unless the sequentially driven pixels emit light simultaneously. Thus, it is difficult to get a screen of high brightness with such a system because it uses only a transient residual image. Fourth, comprising two glass plates, the board is too hard to provide a flexible image display of the screen and is vulnerable to impact and damage.

The display device that scatters the light from the initially provided light output unit by changing the refractive index at the light output control unit provided in the optical waveguide and by guiding the guided light to the light control unit cannot provide a screen of the required brightness. This is because currently available liquid crystals cannot produce sufficient changes in the refractive index for only a pixel of about 100 É m to guide enough light to the light output control unit.

DISCLOSURE OF THE INVENTION

This invention offers display devices capable of monochromic, dichroic, and full-color display, and they feature no mechanical drive unit, high reliability, high quality, high brightness, high-speed response, wide viewing angle, low power consumption, compact and large screens, and at low cost. To achieve the above objectives, the display device of invention first of this patent application is provided with an optical waveguide comprising a plate and optical waveguide made of a pair of first and second optical waveguides, and a transparent electrode and an electrode arranged and formed so that they are positioned to face in opposite directions while sandwiching an electroresponsive material formed in the second optical waveguide.

At least one of the first and second waveguides is formed to closely fit the plate. The first and second optical waveguides are located near or to closely fit each other, so that the light guided to the first optical waveguide leaks and works also as the guided light for the second optical waveguide. The guided light will be trapped in the First (101) and the second (102) optical waveguides. The electroresponsive material (20) is generally transparent against the guided light, and changes in form when voltage is applied across the transparent electrode (30) and the electrode (40). The display device is constituted that the scattering of the guided light in the second optical waveguide (102) caused by this change in form emits the scattered light to the outside as pixels.

First embodiment of this invention states that a transparent plate can be used as the clad portion of the paired optical waveguide and can serve as the board. The optical waveguide is located at one side of the plate and at least one of the first and second optical waveguides is formed to closely fit the plate, so that the optical waveguide itself does not need to have mechanical strength. Thus, this system is suitable for arranging several multiple pairs of thin and fine optical waveguides.

The first optical waveguide of the pair of optical waveguides can be formed easily, for example, as a projection on the surface of the transparent plate, a ridge with grooves in both sides of the place where the first optical waveguide should be located, with its core prepared by laminating layers that have a higher refractive index than the transparent plate, and with clad for the optical waveguide prepared by laminating layers of low refractive index near one side of the surface of the plate and the core embedded in the clad linearly.

Additionally, the second optical waveguide with an electroresponsive material between the pair of electrodes is located near or closely fitted to the top of the first optical waveguide along with the transparent electrode, and the electroresponsive material is enclosed with a transparent material having a lower refractive index than itself to form the clad, so that it serves as the core of the second optical waveguide. Thus, the light guided through the first optical waveguide is guided also through the second optical waveguide with its transparent electrode and electroresponsive material.

When dynamic scattering liquid crystal is used as an electroresponsive material, and a voltage is applied across the pair of electrodes until the threshold electric field is produced, the material will change in form and become opaque and properly scatter and intensify the light guided through the second optical waveguide. Thus, the guided light is emitted as scattered light with high brightness to the outside of the transparent plate of the transparent electrode to be viewed as pixels.

In this case, the pixels emit scattered light and no polarizer is required. Thus, this system can offer bright display devices with a wide viewing angle, different from conventional backlit systems with liquid crystal used as the shutter in combination with the polarizer and color filter.

The display device of second invention of this patent application is provided with an independent two-color optical waveguide, for example, a group of the optical waveguide for the color red and optical waveguide for the color green, or an independent optical waveguide for the light of the three primary colors. A two-color display or a full-color display can be made by guiding two colors or three primary colors of light through the corresponding optical waveguides, respectively. For example, two colors of light (red (R) and green (G)), or three primary colors of light (red (R), green (G), and blue (B)), from a light-emitting diode, laser diode, or organic EL are guided to the corresponding independent optical waveguide for two colors or for three primary colors, and voltage is applied to change the form of the electroresponsive material contained between the pair of electrodes with the electric field. A color display is achieved by scattering the light guided through the optical waveguide and forming the relevant pixels.

For a full-color display, the three cells in the display unit corresponding to the three primary colors of light are used as one pixel and the brightness of the light emitted from the pixel, comprising the respective cells, is adjusted by adjusting the intensity of the scattered light with the color image signal according to the degree of changes in the form of the electroresponsive material.

When groups of independent optical waveguides for two colors or three primary colors are closely arranged to form pixels, contemporary technology is applicable for a two-color display or full-color display system to represent the colors of pixels by adjusting the brightness of the pixels comprising two colors or three primary colors. These groups of independent optical waveguides for two colors and three primary colors are arranged in proper sequence in parallel and linearly to form the same transparent plate or they are laminated in layers. Further, of the independent optical waveguides for the three primary colors, only those for two colors may be formed into the same transparent plate. The plate maybe matched, laminated, and joined in layers with a separate plate formed by the remaining optical waveguides for one color.

The display device of third invention of this patent application guides the light from the light source through an optical waveguide that is integrated with the plate. To construct compact display devices, the light should preferably be guided through the optical waveguide irrespective of the type of light source: an internal light source such as a light-emitting diode or laser diode or external light source.

When guiding the light from a light source through an optical waveguide integrated with the plate, the screen should be made uniform according to the size of the display screen, for example, by decreasing the number of optical waveguides per light source. Certainly, for a large screen, many light sources should be prepared, and their respective dedicated optical waveguides and branch optical waveguides should be predetermined.

The display device of fourth invention of this patent application guides the light from the light source through an optical waveguide integrated with a different plate. Display devices can be constructed, for example, by forming an optical waveguide or by forming only either the first optical waveguide or the second optical waveguide, and by joining the waveguide with the waveguide integrated with a different plate. This has the advantage of being easy to form on the plate at least either of the matrix-like pair electrodes and pair cables (verticals election-line and horizontal selection-line) for the display unit, and drive circuit. When one of the pair is formed on one plate, the other should be formed on the other plate as mentioned above.

Also, with the second optical waveguide of the optical waveguide formed on a transparent plate, part of the optical waveguide integrated on a separate plate can be used as the first optical waveguide for a display unit comprising the matrix-like electrode pair arrangement.

The display device of fifth invention of this patent application has optical waveguides integrated with a separate plate, with the whole or part of the surface of the optical waveguides covered with reflective film. The reflective film encloses the light scattered inside the optical waveguide integrated with a separate plate, so that the light can be guided effectively to the optical waveguide.

The display device of sixth invention of this patent application has scattering materials in the optical waveguide, light-scattering materials, and a lens in the optical waveguide integrated with a separate plate to guide the light effectively to the optical waveguide.

The light guided from the light source to the optical waveguide integrated with a separate plate is scattered with the scattering materials in the optical waveguide and irradiated against the light-scattering materials, and the light-scattering materials are regarded as the second light source. Thus, the light from the light-scattering materials is the main part of the light guided through the lens to the optical waveguide. Thin holographic lenses or convex lenses (depending on the refractive index distribution) should be used.

The display device of seventh invention of this patent application uses a light-emitting diode or laser diode as the light source for the optical waveguide. These diodes are very stable and can be used as a highly efficient and long-life light source. Also, because the light sources are built independently of the display unit comprising matrix-like pixels, only good light sources can be selectively installed after good display devices are built. This ensures extremely high yield of non-defective display devices.

The display device of eighth invention of this patent application uses a light-emitting diode or laser diode, integrated with the above-mentioned plate or a separate plate, as the light source for the optical waveguide. The light source is integrated with the optical waveguide which is integrated with a separate plate, thus ensuring a compact and stable display.

The display device of ninth invention of this patent application uses an external light source for the optical waveguide. It guides sunlight or the light from a light bulb to the optical waveguide for display. Because the light source consumes most of the power required for a display device, this version uses ambient light in a bright environment as the light source other than an installed light source for low power consumption. The display device may allow switching between internal and external light sources.

The display device of tenth invention of this patent application couples the light from an external light source with the optical waveguide integrated with a separate plate using an optical coupler of a rugged structure. It effectively couples the light from an external light source with the optical waveguide integrated with a separate plate using an optical coupler of graded ruggedness or Fresnel zone plate or Fresnel lens.

The display device of eleventh invention of this patent application uses an external light source as described in the ninth and tenth inventions. For color display, it uses a color filter to change the guided light to the specific color.

The display device of twelfth invention of this patent application uses plates of which at least either one is of plastic. When using either plate as the clad portion, the plate must have a lower refractive index than that of the core of the optical waveguide that guides the light. Using both this plate and the other plate of plastic, display devices can be produced at low cost with display screens that are light in weight, resistant to impact and bending, and in various sizes from small to large.

The display device of thirteenth invention of this patent application uses an electroresponsive material as the light-scattering liquid crystal. Ferroelectric liquid crystal and twisted nematic liquid crystal can be used as the light scattering liquid crystal. The light scattering liquid crystal is transparent when an electric field is not applied to it, and it becomes unstable and opaque when exposed to white light. When voltage is applied across the pair electrodes, sandwiching the liquid crystal of the above type, until the electric field exceeds the threshold, the liquid crystal will becomes murky and the light, coming in from the transparent electrode side and being guided, is scattered there and emitted outside the transparent plate, thus displaying the relevant portion as the cell of the pixel having the color of the guided light of the image. Because the guided light is scattered directly, light-emitting pixels of high brightness are obtained. The brightness of the pixels can be adjusted by adjusting the intensity and length of the signal voltage to be applied to the light-scattering liquid crystal. Certainly, the cell portion of the pixels formed on the optical waveguide for red light emits the red light being guided. Also, the optical waveguides for the blue and green lights emit those lights in the same manner.

The display device of fourteenth invention of this patent application uses an electroresponsive gel as the electroresponsive material. As it generally is a high molecular jelly-like gel, the electroresponsive gel changes its volume by shrinking or expanding when an electric field is applied to it. This invention scatters the guided light through partial deformation of the optical waveguide caused by the shrinkage or expansion of the electroresponsive gel formed between the electrodes under the voltage applied across the electrodes, which are paired as a pixel. Because the electroresponsive gel is jelly-like, the electrode paired with an transparent electrode moves with the electroresponsive gel in which the electrode pair is formed and which deforms when the voltage is applied to it caused by the image signal. As it is a semisolid and has no mechanical contact or isolated portions such as a cantilever, the gel is free from leakage and easy to handle, although it has some moving parts.

The display device of fifteenth invention of this patent application uses an electroresponsive material as the electrochromic material. Using oxidation/reduction by the movement of ions in an electrolyte of an electrochromic material such as tungsten oxide, this invention toggles the color of the material between colorless to blue or other colors. The device is easy to fabricate using a solid electrolyte as the inorganic material. To use the change in color of an electrochromic material such as tungsten oxide that changes its color from colorless to blue, this electrochromic material and its electrolyte sandwiched between the pair electrodes (pixels) as the optical waveguide for color development are used. When the electrochromic material is colored, the guided light of the same color as the coloring is scattered and emitted outside. To make the colored material colorless, the voltage applied across the pair electrodes (pixels) is reversed from that applied when coloring. This invention has the advantage of being able to drive at low voltage, because oxidation/reduction can occur at 1 V or less.

When the display device is used for still images or television, the screen becomes dark because the time required for light emission is too short if the guided light (pixel) is scattered and turned off instantly. To avoid this, the scattered light should continue to be emitted even when the next pixel is selected. The guided light weakens when the scattered light is emitted from the cell units of two or more pixels at the same time. To avoid this, the power of the light source should be adjusted and the emission time should lengthened depending on the number of pixels emitting the light at the same time, so that the desired uniform brightness of the pixels can be obtained independently of the number of the pixels selected simultaneously.

EFFECTS OF THE INVENTIONS

As explained above, the inventions of this application effectively scatter the guided light through changes in form such as by opaquing, deformation, and coloring, by guiding the light through the optical waveguide comprising the pair of the first optical wave guide and the second waveguide, also through the second optical waveguide generally containing transparent electroresponsive materials, and by applying the image signal voltage across the pair electrodes sandwiching the electroresponsive materials. Thus, the inventions offer low power consuming and high brightness display devices. The inventions of this application can use a transparent plate as the clad portion of the optical waveguide and also can use it as the supporting board.

The optical waveguide can be arranged and formed on one side of the plate. Thus, the optical wave guide does not need mechanical strength, allows a number of thin and fine optical waveguides to be arrayed in high density, and has no mechanical displacement portion, enabling it to offer small-to-large display devices of high reliability and fine high quality pixel. Also, because the core of the optical waveguide is not exposed, no foreign matter such as dust or dirt will adhere to the optical waveguide portion of the optical waveguide. Thus, the display devices of the inventions of this application can provide optimal performance even in inferior environments. The main materials of the image display for the display device such as transparent plates, optical waveguide, and clad portion can be made of plastic, which can be flexibly bent mechanically, thus making it possible to offer light-weight and impact-resistant display devices. Also, because the pixels emit scattered light, the inventions can offer display devices with a wide viewing angle, different from conventional devices that use a back light, and liquid crystal combined with the polarizer as an optical shutter. Also, the display devices of the inventions are capable of not only monochromic display, but also two-color or full-color display by guiding the light of two colors or three primary colors through the corresponding waveguide (100). The display devices transmit the light from light sources such as light-emitting diodes (LED) and laser diodes (LD) of three primary colors, red (R), green (G), and blue (B) to the pixel portion through thin optical waveguides. Further, as they require no polarizer or color filter, the devices can directly emit scattered light to the outside and can be made thin. Thus, the display devices of this invention are bright compact and cost-effective. Also, the full-color display devices have independent optical waveguides of three primary colors, red (R), green (G), and blue (B), so that the respective waveguides can display pixels made of independent cells for the three primary colors only. Although they use a sequential drive system, the display devices can be adjusted so that, even when the next pixel portion is selected, the preceding pixel portion can emit light at the same time. Thus, the display devices are bright, with extremely little flickering.

Also, the display devices have the advantage of low power consumption, because they can use not only the internal light source, but also an external light source. Also, the pair of the first optical waveguide and the second optical waveguide that comprise the optical wave guide, and the pair of the electrode and its wiring that form a matrix-like pixel, can be joined or located closely to each other by forming one of the pair on a plate and the other on a different plate. Thus, the devices can be assembled using good parts only, thereby raising the yield of non-defective components and lowering the prices of the displays accordingly.

Further, the optical waveguide is divided into the pair of the first optical waveguide and the second optical waveguide that comprise the waveguide, thereby making the first optical waveguide sufficiently transparent and bright against the guided light and allowing part of the light guided through the first optical waveguide to be coupled and propagated to the second optical waveguide. Thus, this display device is suitable for a large screen even when the second optical waveguide is not very transparent against the guided light because the guided light is sufficiently propagated to the first optical waveguide.

The first optical waveguide is a multi-mode waveguide to guide a large amount of light, and the light is guided at various angles. When the second optical waveguide has a lower refractive index than that of the first optical waveguide, part of the light propagating through the first optical waveguide at a large angle leaks to become the light propagated through second optical waveguide.

When the second optical waveguide has a higher refractive index than that of the first optical waveguide, and a layer with a lower refractive index is formed between the first optical waveguide and the second refractive waveguide (The layer may be an air gap of proximity, liquid crystal alignment film, or other transparent layer), the second optical waveguide acts as having an equivalent lower refractive index. Thus, the second optical waveguide is equivalent to an optical waveguide that has a lower refractive index than the above first optical waveguide.

BRIEF DESCRIPTION OF THE DRAWINGS

FIG. 1(*a*) is the horizontal sectional view of the arrangement of the optical waveguide for the three primary colors.

FIG. 1(*b*) is the longitudinal sectional view Y—Y in FIG. 1(*a*) along the optical waveguide for the color blue.

FIG. 5(*a*) is the rough horizontal sectional view of the arrangement of the optical waveguides 100*r*, 100*g*, 100*b*, for the three primary colors.

FIG. 5(*b*) is the enlarged rough view near the optical waveguide 100*r* for the color red.

FIGS. 7(a) is a rough plan and 7(b) shows horizontal sectional views X—X.

FIGS. 8(a) is a rough plan and 8(b) shows horizontal sectional views X—X.

BEST EMBODIMENTS OF THIS INVENTION

We will explain the display devices of this invention in detail by referring to Figures. In the FIGS. 10, 11, 12, and 15: plate, 20: electroresponsive material, 25: electrolyte, 30, 30r, 30g, 30b: transparent electrode, 40, 40r, 40g, 40b: electrode, 50: vertical selection line, 60: horizontal selection line, 100, 100A: optical waveguide, 100b: optical waveguide for the color blue, 100g: optical waveguide for the color green, 100r: optical waveguide for the color red, 101: first optical waveguide, 102: second optical waveguide, 105: scattering materials in the optical waveguide, 111, 111r, 111g, 111b: taper optical waveguide, 120, 121, 122, 123, 124, 125: clad portion, 130, 130r, 130g, 130b: lens, 140, 140r, 140g, 140b: light-scattering material, 150, 150r, 150g, 150b: light source, 200: pixel, 300, 310, 320: reflection film, 400: optical coupler, 450, 450r, 450g, 450b: color filter, 500: display.

Embodiment 1

Figure 1:
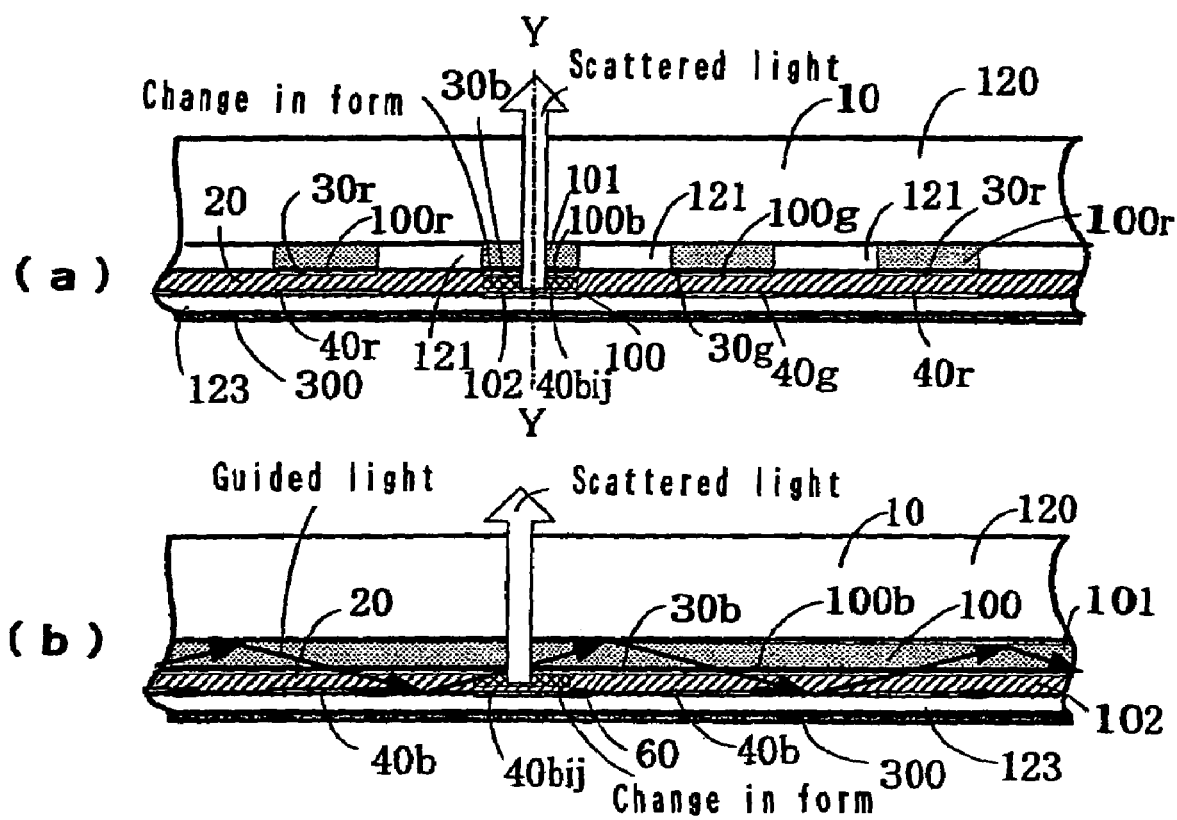
FIG. 1 is the rough sectional view of an embodiment of the full-color display using light-scattering liquid crystal as the electroresponsive material, a component of the display device of this invention.

FIG. 1 illustrates an embodiment of the component of the display device of this invention using dynamic scattering liquid crystal as the electroresponsive material 20, and transparent plate 10 as the clad portion 120 of the optical waveguide 100 comprising the pair of the first optical waveguide 101 and the second optical waveguide 102. The component also uses the plate 10 as the supporting board for the thin optical waveguide 100. In addition, the three primary colors, optical waveguide for the color red 100r, optical waveguide for the color green 100g, and optical waveguide for the color blue 100b, are arrayed sequentially on both sides of the transparent clad portion 121, so that the device is capable of full-color display.

FIG. 1 also illustrates how the electroresponsive material 20 becomes murky and causes the blue light, or the guided light, to be emitted outside the transparent plate 10 and observed as a blue pixel. The electroresponsive material 20 comprises the liquid-scattering liquid crystal in the second optical waveguide located between transparent electrode 30b and electrode 40bij, which are the selected pair electrodes of the optical waveguide 100b for the color blue.

The principle of operation of the display device of this invention is explained using FIG. 1 as follows:

FIG. 1(a) is the horizontal sectional view of an embodiment with the arrangement of independent optical waveguides 100r, 100g, 100b for the three primary colors. In this embodiment, on one side of the plate 10, comprising, for example, acrylic plastic and having the action of the clad portion 120 and the supporting board to provide the mechanical strength of the optical waveguide, are formed the optical waveguide for the color red 100r, which is an epoxy core with a large refractive index, the optical waveguide for the color green 100g, and the optical waveguide for the color blue 100b in sequence in the same plane, with the transparent epoxy clad portion 121 having a small refractive index interposed. Along the optical waveguides 100r, 100g, 100b for the three primary colors, transparent electrodes 30r, 30g, 30b are formed. The transparent electrodes 30r, 30g, and 30b are common electrodes, and on the epoxy sheet of the clad portion 123 are formed electrodes 40r, 40g, and 40b opposing the transparent electrodes at equal pitches in one line. With at least a layer of dynamic scattering liquid crystal (optical scattering liquid crystal) inserted between these opposing electrodes (pair electrodes) as the electroresponsive material 20 in the second optical waveguide 102, the epoxy sheet of the clad portion 123 is coupled with the plate 10.

Generally, nematic liquid crystal has an average refractive index of about 1.56, which larger than that (1.48) of ordinary glass. Thus, the light is easily guided to this liquid crystal layer. The reflection film 300 (such as aluminum) is formed by vacuum deposition on the surface opposite to electroresponsive material (epoxy sheet) 20 of the clad portion 123. The color image signal voltage is supplied to the selected electrode 40ij among the linearly arrayed electrodes 40r, 40g, and 40b, paired to the transparent electrodes 30r, 30g, and 30b, through the horizontal selection line 60 formed along the electrodes 40r, 40g, and 40b. The color image signal voltage is supplied to the transparent electrodes 30r, 30g, and 30b, through the vertical selection line 50 (not shown). The simple matrix drive system using contemporary technology can be used as the liquid crystal display system. Of course, a active matrix drive system using TFT by means of contemporary technology can also be used as the liquid crystal display system.

FIG. 1(b) is the longitudinal sectional view Y—Y in FIG. 1(a) along the optical waveguide 100b for the color blue. Voltage is applied to the common transparent electrode 30b formed along the optical waveguide 100b for the color blue in Fig. (a), and to the electrode 40bij, the blue cell in this specifically selected one pixel in the electrode 40 or linearly arranged pixels pair to the above common electrode (The suffixes ij mean the electrodes, arranged in matrix-like, when line i and row j, specified respectively). In this embodiment, the light-scattering liquid crystal becomes murky due to the electric field thus caused, and the blue light leaked from the first optical waveguide 101 and guided to the second optical waveguide 102 of the light-scattering liquid crystal through the transparent electrode 30b, is scattered here and emitted outside the transparent plate 10. In a full-color display, the three optical waveguides 100g for the color green, 100b for the color blue, and 100r for the color red, work as one group to perform horizontal and vertical scanning through the horizontal selection line (60) and vertical selection line (50). Voltage is applied by the color image signal to the transparent electrode 30 and its pair electrode 40 of the groups corresponding to the respective colors comprising one pixel in a nearby area. Thus, the respective guided lights are scattered by the corresponding light-scattering liquid crystal and form one pixel comprising a three-color cell for the three primary colors.

The contrast or the brightness of the pixel can be adjusted by adjusting the size of the color image signal voltage and the light scattering time. The light scattering time can be adjusted also by applying a quenching pulse such as reverse voltage for light scattering in a suitable time after start of the scattering mode. Light-emitting diodes and laser diodes can be used as the light source for the three primary colors to offer convenient, compact, and high-brightness display devices.

The transparent electrode 30 for the display device of this invention can be prepared by sputtering an ITO film or tin oxide film of about 0.1–0.3 É m thickness. The electrode 40 can also be made of transparent ITO film or tin oxide film, or a non-transparent aluminum that reflects light as required.

Embodiment 2

Figure 2:
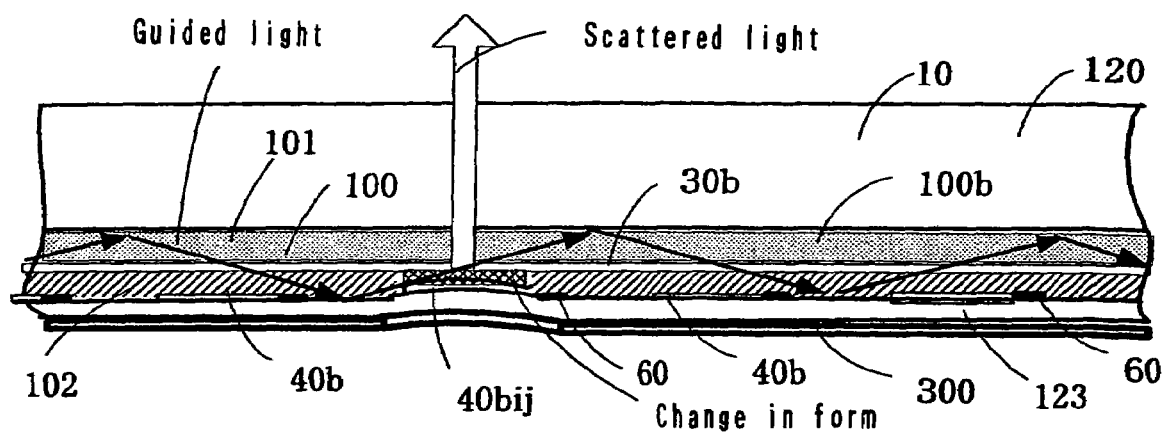
FIG. 2 shows the longitudinal sectional views of an embodiment of the optical waveguide for the color blue, using jelly-like gel that expands and shrinks under an electric field as the electroresponsive material, a component of the display device of this invention.

FIG. 2 shows the longitudinal sectional views along the optical waveguide 100b for the color blue, using a jelly-like gel (electroresponsive gel) that expands and shrinks under an electric field as the electroresponsive material 20 for the display device of this invention, as is shown in FIG. 1(b). When a color image signal voltage is applied between the transparent electrode 30b and the electrode 40ij selected from the electrode 40, paired to the electrode 30b, the electroresponsive gel that will become the second optical waveguide 102 changes in form (shrinks), decreasing its sectional area. Thus, the blue light guided there is scattered and emitted outside the transparent plate 10. Gel used as artificial muscle is suitable for the electroresponsive gel. Transparent polyurethane gel, for example, can also be used. Epoxy sheet or polyethylene sheet of about 50 É m thickness that deforms easily according to the expansion and shrinkage of the gel can be used as the clad portion 123.

Embodiment 3

Figure 3:
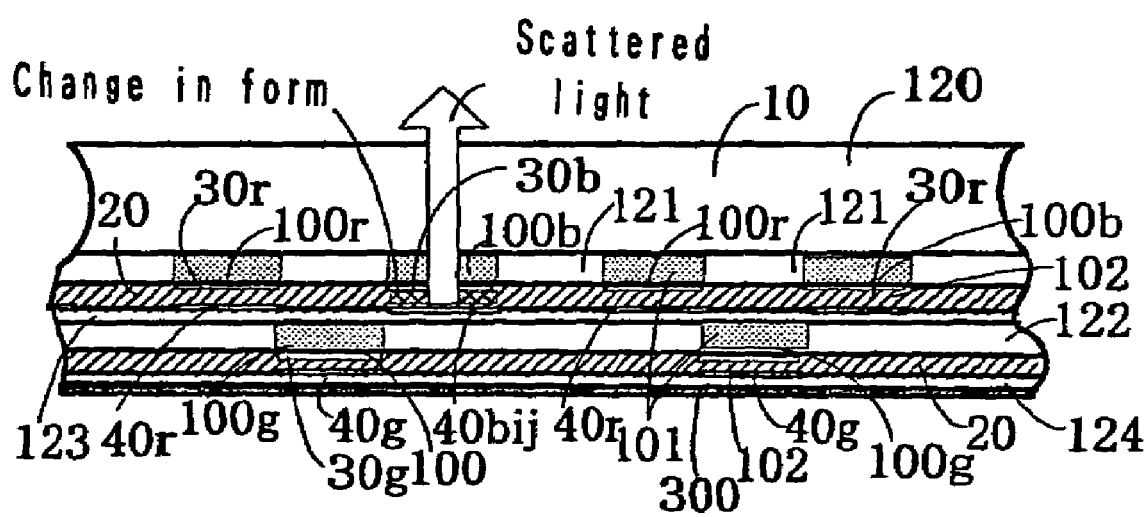
FIG. 3 shows the rough sectional views of another embodiment of the full-color display of the display device of this invention.

Differing from FIG. 1 in Embodiment 1, FIG. 3 shows the horizontal sectional views of an embodiment in which only several optical waveguides 100r for the color red and 100b for the color blue are formed sandwiching the clad portions 121 on the same plane of the plate 10, while the optical waveguide 100g for the color green is formed periodically on the clad portion 123 sandwiched by the clad portion 122. Each optical waveguide 100g for the color green is located between the optical waveguides 100r for the color red and 100b for the color blue. Also in FIG. 3, the image signal voltage over the threshold limit value is applied to the pair electrodes comprising the transparent electrode 30b and the electrode 40bij formed on the optical waveguide 100b for the color blue. The electric field thus caused makes the electroresponsive material 20 (Light-scattering liquid crystal layer of the second optical waveguide 102) murky and emits the scattered light to the outside as pixels from the light-scattering liquid crystal layer (Electroresponsive material 20 in the area sandwiched between the pair electrodes).

FIG. 3 shows a layer provided with the clad portion 122 and optical waveguide for the color green 100g, layer of the electroresponsive material 20, layer of pair electrodes, clad portion 124 and reflection film 300: layer of optical waveguide 100r for the color red and layer of blue pair electrode, clad portion 124 and reflection film 300: layer of optical waveguide for the color red 100r and optical waveguide for the color blue 100b, layer of electroresponsive material 20, layer of pair electrode, and clad portion 123, laminated and formed on the plate 10.

Another embodiment, although not illustrated here, includes, for example, a layer provided with the clad portion 122 and the optical waveguide for the color green 100g, layer of electroresponsive material 20, layer of pair electrode, clad portion 124 and reflection film 300, formed on a separate plate 11 are closely coupled with the laminated films including the optical waveguide for the color red 100r and optical waveguide for the color blue 100b that comprise the optical waveguide, thus having almost the same arrangement for that of the three primary colors shown in FIG. 3, except for the existence of the plate 11 which is different from the plate 10.

Embodiment 4

Figure 4:
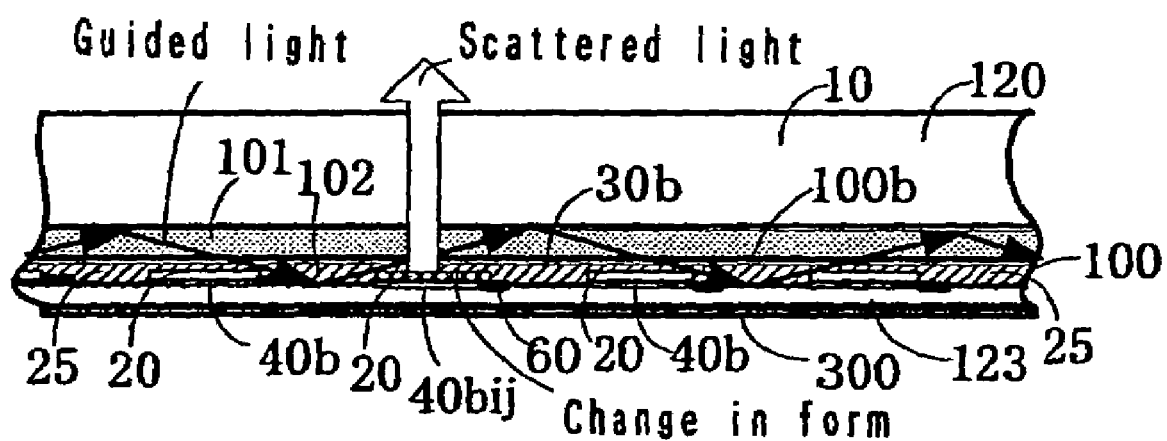
FIG. 4 shows the longitudinal sectional views of an embodiment along the optical waveguide for the color blue, using electrochromic material such as tungsten oxide as the electroresponsive material, a component of the display device of this invention.

In FIG. 4, an electrochromic material such as tungsten oxide is used as the electroresponsive material 20. In the same manner as that shown in FIG. 1(b) for the above Embodiment 1, the transparent electrode 30b is formed on the optical waveguide 100b for the color blue and tungsten oxide WO3 is, for example, sputter-deposited as the electroresponsive material 20 in the second optical waveguide 102 on the pair electrodes to the above transparent electrode. FIG. 4 shows the sectional view of this embodiment with the space between these pair electrodes filled with electrolyte 25.

Coloring can be toggled between colorless and blue using oxidation-reduction action by the movement of ions in the electrolyte 25 of the electrochromic material such as tungsten oxide. Tungsten oxide changes from colorless to blue when it is reduced. Thus, when an image voltage is applied so that the selected electrode 40bij side has a negative potential against the transparent electrode 30b, the tungsten oxide is colored blue. The blue light guided to the point is scattered at the colored portion and can be seen as blue pixels from outside. The electrochromic material can be made easily using a solid electrolyte. To make the colored chromic-material colorless, a reverse voltage from that applied for coloring is applied to the electrode 40bij. Because a voltage below 1 V can cause oxidation/reduction, this embodiment can be operated at low voltage. The coloring of the electrochromic material is based on electrochemical reaction (change in form). Contrast can be adjusted by the size and application time of the image signal, and the timing of the return-to-colorless reverse voltage signal. In FIG. 4, the electrochromic material is formed on only the electrode 40b as the electroresponsive material 20. Because its electrical conductivity is not so high, it may be formed not only on the electrode 40b, but also on the whole surface of the clad portion 123 including the electrode 40b. Also, because the electrochromic material should be present on the electrode separated for the pixel display, the transparent electrode 30b maybe divided as the pixels without making it a common electrode, and electrochromic may be formed on only the transparent electrode 30b closely, or uniformly including the transparent electrode 30b.

Embodiment 5

The above embodiment is based on the change in form of the electroresponsive material 20 in the second optical waveguide 102, and the image display by the guided scattered light can be observed from the outside of the transparent plate 10. Obviously, by making the electrode 40 transparent and removing the reflection film 300 from the above place or forming it between the transparent plate 10 and optical waveguide 100, or forming it on the outside surface of the plate 10, the image display can be observed from the optical waveguide 100 side (opposite to the plate 10). In this case, the plate 10 does not need to be transparent.

Figure 5:
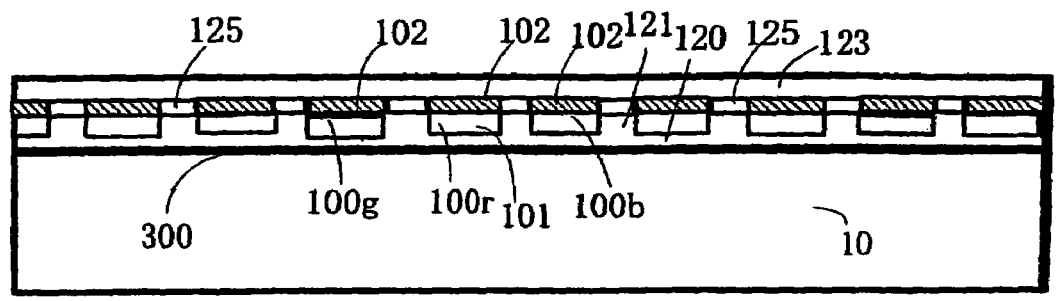
FIG. 5 shows an embodiment of the full-color display of this invention.
Figure 5:
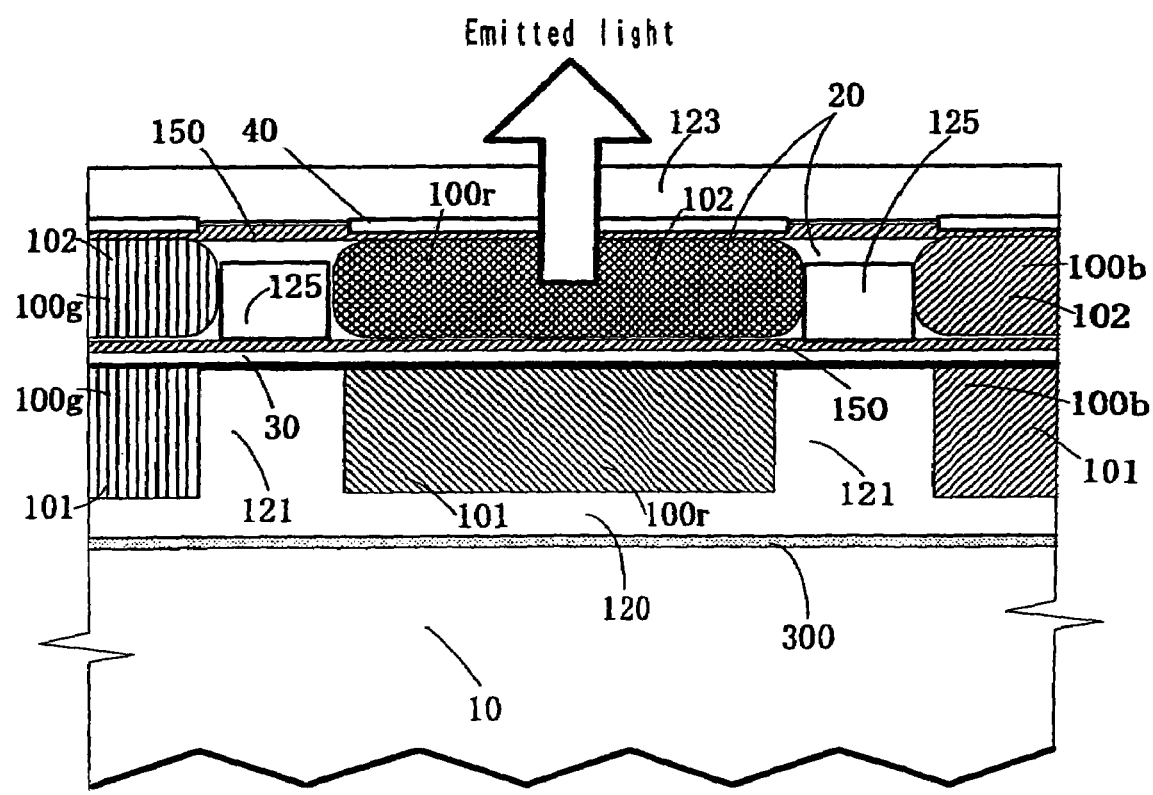

FIG. 5 is an embodiment with the reflection film 300 formed between the plate 10 and optical waveguide 100. The plate 10 does not necessarily need to be transparent. FIG. 5(a) is an embodiment with independent optical waveguides for the three primary colors 100r, 100g, and 100b. FIG. 5(b) is an enlargement near the optical waveguide for the color red 100r. It shows how the electroresponsive material 20 (The material 20 comprises the light-scattering liquid crystal in the second optical waveguide 102 contained between the transparent electrode 30 and electrode 40, which are paired with the cell comprising the pixel selected from the optical waveguide for the color red 100r) becomes murky, the guided red light is scattered and taken out as the emission light through the transparent electrode 40, reflected also on the reflection plate 300 formed on the plate 10, and observed as a bright red pixel.

In FIG. 5(b), the dynamic-scattering liquid crystal with a high refractive index serves as the core of the second optical waveguide. To prevent the bleeding of light to the neighboring optical waveguides, the light is optically separated with the clad 125 which has a lower refractive index than that of the dynamic scattering liquid crystal.

Embodiment 6

Figure 6:
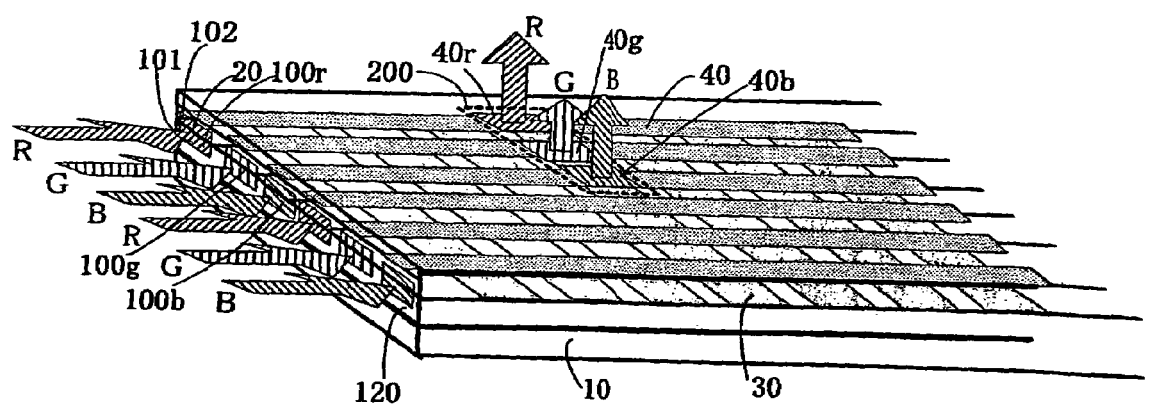
FIG. 6 is the rough oblique view of an embodiment, showing the mechanism of the full-color display using the light emitted from one pixel 200 comprising three cells of the three primary colors, a component of the display device of this invention.

FIG. 6 shows how the three primary colors are guided to the dedicated optical waveguide and the selected pixel 200 emits the light of the specified color.

Embodiment 6 has independent optical waveguides for the three primary colors 100r, 100g, 100b, to which the colors red light R, green light G, and blue light B are guided, respectively. Voltages corresponding to the video signals are applied between the selected electrodes 40r, 40g, 40b and respective pair transparent electrode 30. Red light R, green light G, and blue light B with different light intensities are emitted from one pixel 200 comprising the three cells of the three primary colors to produce a full-color display.

Embodiment 7

Figure 7:
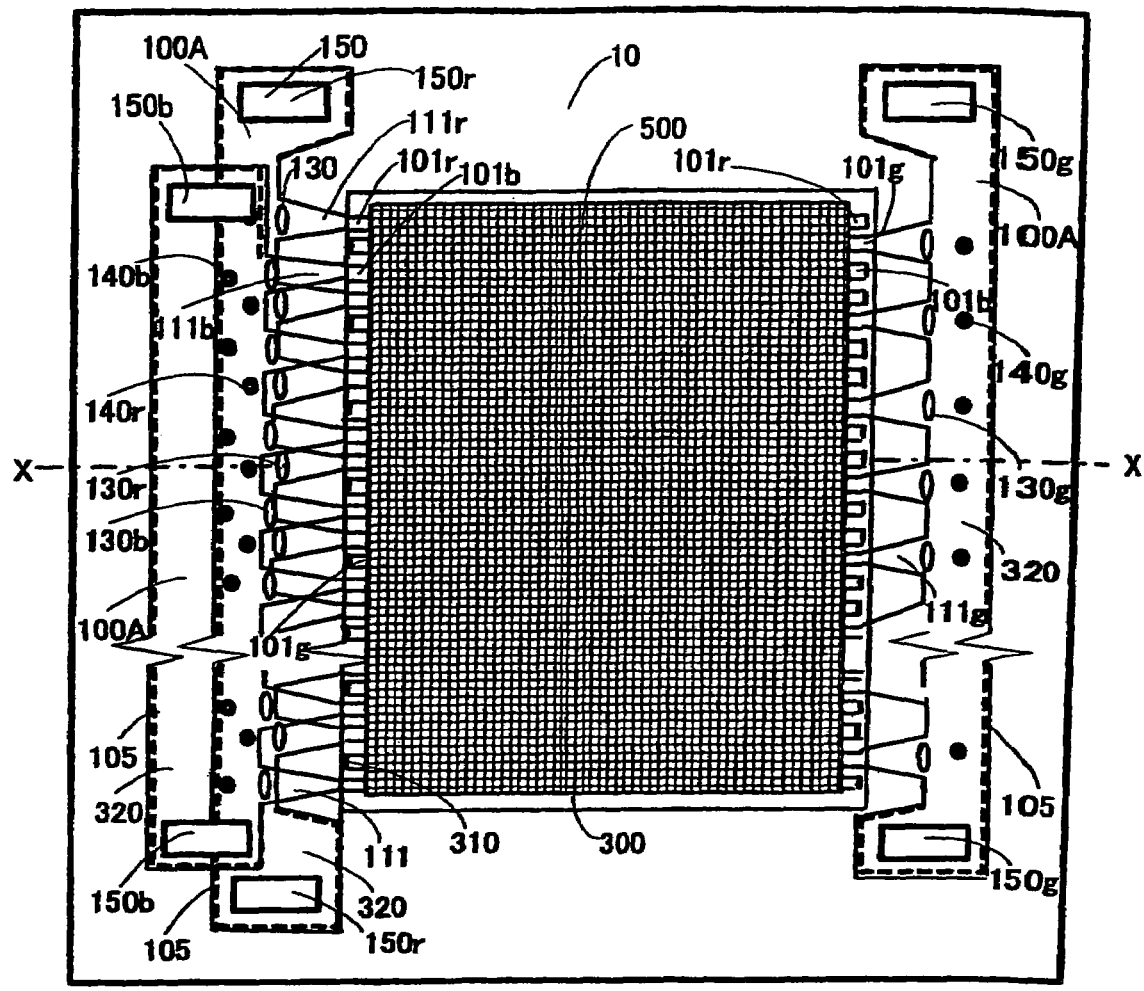
FIG. 7 is an embodiment showing how the light is distributed to the optical waveguide of each display unit through the respective optical waveguides from the LED light source of three primary colors.
Figure 7:
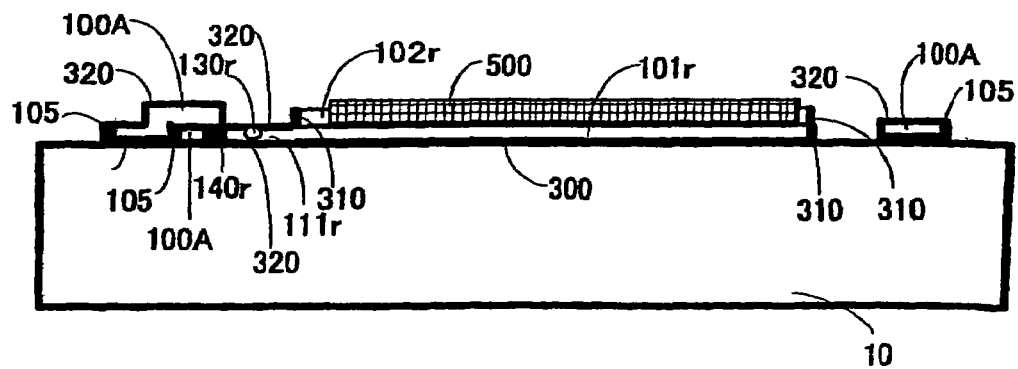

FIG. 7 is the display device of this invention for full-color display, showing the arrangement with a focus on the light source 150, optical waveguide, and the display unit 500 with the matrix-like electrode array, and the plate 10. FIGS. 7(a) is the plan view and 7(b) shows the horizontal sectional view at X—X in 7(a).

The respective lights, emitted from the light sources (red) 150r, (green) (150g, and (blue) (150b) corresponding to the three primary colors of the light source 150, such as light-emitting diodes (LED), are coupled with the optical waveguide of thin film 100A and guided, and are then scattered by the scattering materials in the optical waveguide 105 provided in the respective optical waveguide 100A. The lights then irradiate the scattering materials 140r, 140g, and 140b corresponding to the taper optical waveguides 111r, 111g, and 111b guiding to each of the optical waveguides 101r, 101g, 101b under the display unit 500 in each optical waveguide 100A.

The light scattering materials 140r, 140g, and 140b work just like the respective second light sources, and they are converged through film-like lenses 130r, 130g, and 130b corresponding to 140r, 140g, and 140b, and then guided to each optical waveguide 100. In FIG. 7, two each of the light sources 150 of the same color are provided for the optical waveguide 100A corresponding to each of the three primary colors, to produce pixels with high brightness.

In this embodiment, the optical waveguide 100A is covered with the reflection film 320 and the reflection film 310 is provided on the end surface of each optical waveguide 100. The display unit 500 also has the plate 10 with the reflection film 300 formed on it, to prevent the leakage of display pixels other than those selected, thereby maintaining brightness inside the optical waveguide 100.

Embodiment 8

Figure 8:
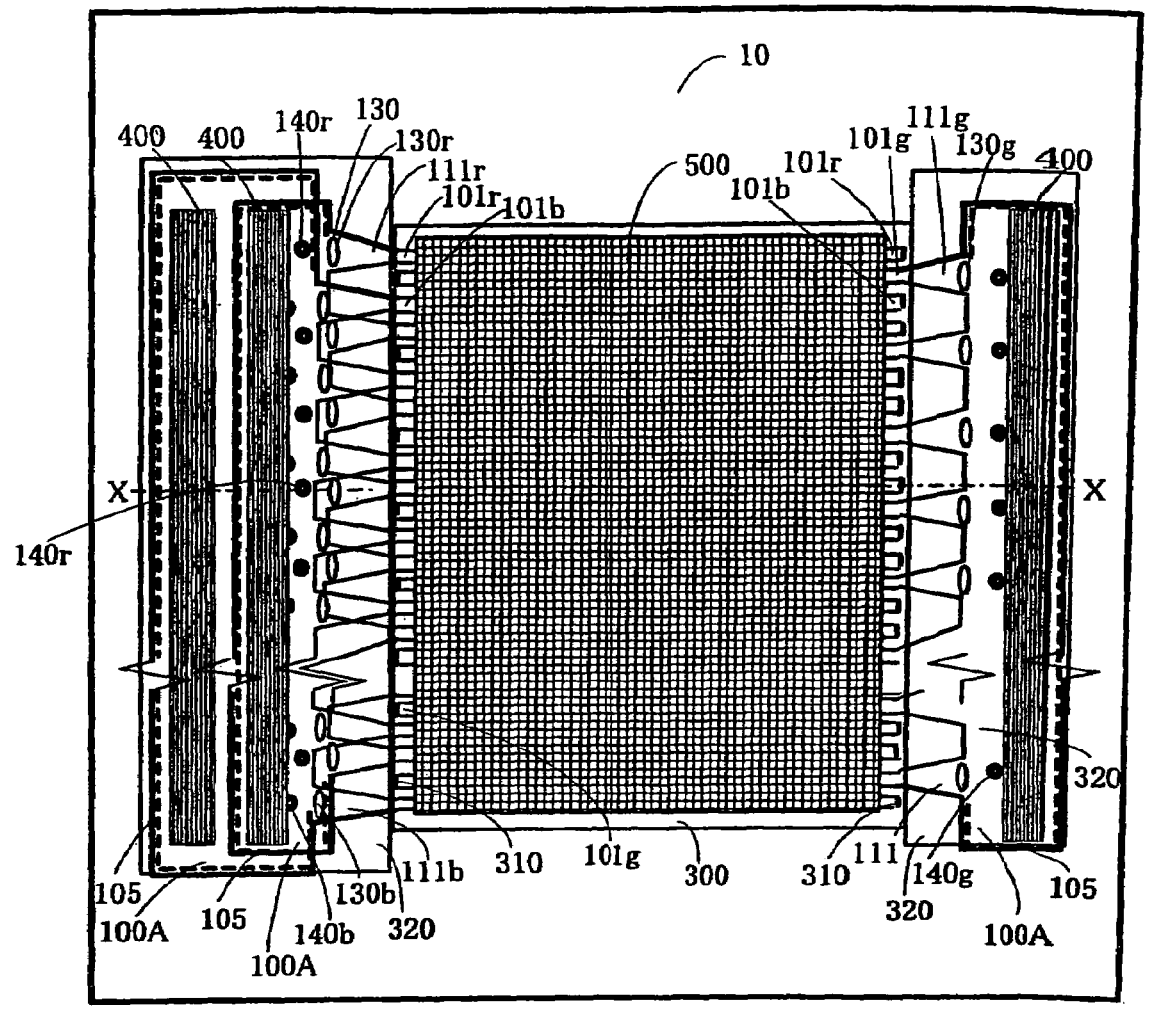
FIG. 8 is an embodiment using an external light source.
Figure 8:
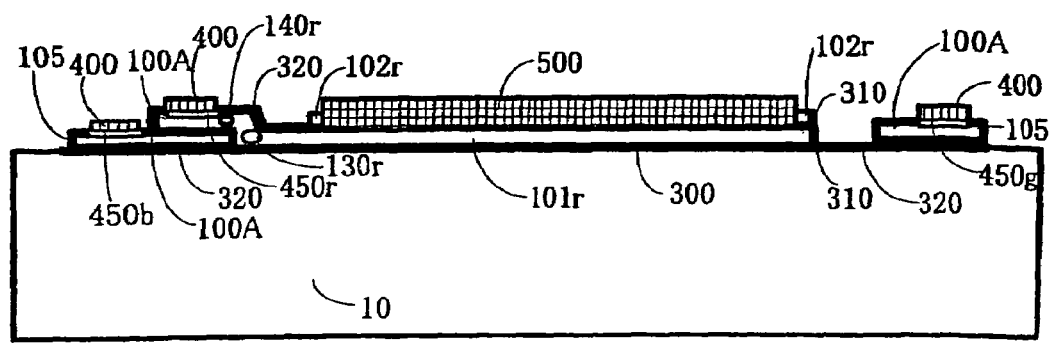

FIG. 8 is the display device of this invention for a full-color display and is the same as the embodiment shown in FIG. 7, except that the optical coupler 400 to use external light sources and the color filters 450, 450r, 450g, and 450b to obtain the three primary colors are provided instead of the three primary colors 150r, 150g, 150b (150 in FIG. 7). FIG. 8(a) is a plan view. FIG. 8(b) is a horizontal sectional view. The optical waveguides 110A for the colors red and blue provided with optical coupler 400 are inverted from the embodiment shown in FIG. 7.

Optical coupler 400 can be conveniently made from plastic using filter-like or rugged diffraction grating, or a Fresnel lens.

The light from an external light source is converted into the three primary colors through the optical coupler 400 and color filters 450r, 450g, and 450b, then passes through respective optical waveguides 100, and is guided to the optical waveguide 100A in the same manner as shown in Embodiment 7.

The optical coupler 400, color filter 450, and built-in light source 150 such as LED may be provided as required, although they are not illustrated here. The optical shutter 400 should be provided with a shutter for switching.

Embodiment 9

Figure 9:
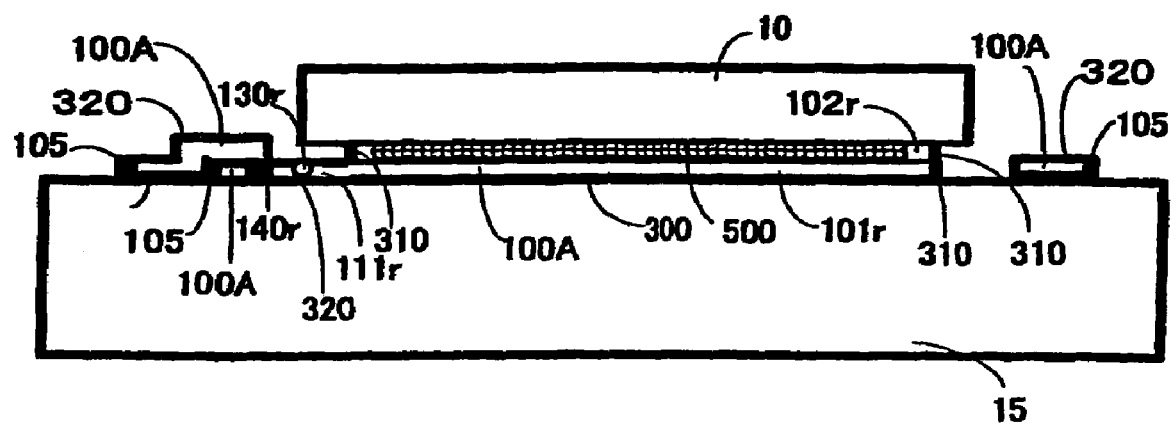
FIG. 9 is the rough sectional view of an embodiment using an external light source, a component of the display device of this invention.

FIG. 9 is the horizontal sectional view of an embodiment of the display device of this invention. The light source for the three primary colors 150 and optical waveguide 100A are arranged in the same manner as that of the embodiment in FIG. 7, except that they are pre-formed on the plate 15 and one of the pair matrix-like electrodes is formed on the transparent plate 10 together with the second optical waveguide 102. On the plate 15, are formed the first optical waveguide 101 of the optical waveguide 100 and its counterpart of the pair electrode. The first optical waveguide 101 is integrally coupled with the second optical waveguide 102 formed on the plate 10, making up the display unit 500 comprising matrix-like pair-electrode pixels. In this embodiment, the first optical waveguide 101 is part of the optical waveguide 100A integrated in the plate 15. Because the reflection film 300 is formed in the plate 15, the plate does not need to be transparent. Instead, the plate 10 is transparent so that the image is displayed from the top of the plate 10.

Obviously, when the reflection film 300 of the embodiment in FIG. 9 is formed on the side of the plate 10 of the display unit 500, the plate 10 may be non-transparent, and the image can be viewed from the plate 15 side if the plate 15 is transparent and a transparent electrode is used.

Regarding the optical waveguide 100A integrated in the plate 15 of this embodiment shown in FIG. 9, the display device of this invention can also be constituted by forming the first optical waveguide 101 and the second optical waveguide 102 of the optical waveguide 100 on the plate 10 in advance, and closely coupling the first optical waveguide 101 with the optical waveguide 100A.

Also, the optical waveguide 100 maybe constituted as pair by coupling closely or proximately the first optical waveguide 101, pre-formed on the plate 10, with the second optical waveguide 102, formed in a third plate 12, different from the plates 10 or 15. In this case, one of the pair of the transparent electrode 30 and electrode 40 pair used to comprise a pixel, and the pair wiring, can be formed on the plate 10 and the other on 12. Additionally, an electroresponsive material 20 such as dynamic scattering liquid crystal should be inserted between the pair electrodes and used as the core for the second optical waveguide 102.

Although the above embodiment does not show the matrix-like pair electrodes, pair wiring (vertical selection line 50 and horizontal selection line 60), nor their drive circuit, the wiring for the pair electrodes should be formed on the optical waveguide 100 or either of the flattened first optical waveguide 101 or the second optical waveguide 102, and should be extended outside the optical waveguide 100 and formed on the plate 10 or 15 together with the drive circuit. In the embodiment shown in FIG. 9, the complexity of the optical waveguide 100A integrated on the plate 15 can be conveniently avoided by forming the wiring and drive circuit on the plate 10. As shown in FIG. 9, one of the pair of the matrix-like electrodes and wiring is formed on the plate 15 and the other on the plate 10. Because the pair wirings cross at right angles to each other, the pair wirings can be extended to a free area on the surface of the plates 15 and 10, without the first optical waveguide 100A or the second optical waveguide 102 formed on them. Thus, the pair wirings can be formed closely and directly on the plates 15 and 10, enabling easy-to-build and stable display devices.

In the above embodiment, the pair electrodes and wiring are arranged and formed so that voltage is applied, even when it is applied through the alignment layer, almost directly to the electroresponsive material 20 such as the liquid crystal in the second optical waveguide 102, which is one of the components of the optical waveguide 100. However, direct application of voltage is not necessarily required. Considering that the first optical waveguide 101 has thickness and some electric conductivity, one of the pair of the electrode and wiring may be formed outside the first optical waveguide, so that voltage is applied across the first optical waveguide 101 and the second waveguide 102.

If for the waveguide light source 150, for example, one blue LED is not sufficiently bright, two or more LEDs can be optically coupled with the corresponding optical waveguide 100A and they can be turned on simultaneously.

The above embodiments are only examples of the embodiments, and other variations with the same objectives, operation, and effects as those of this invention may exist.

INDUSTRIAL APPLICABILITY

As explained above, as they have no mechanical driving unit, the display devices of this invention are reliable, offer fine high-quality pixels, high brightness, high-speed response, emit scattered light from the pixels, and require no polarizer. Thus, differing from conventional display devices, which use a back light and the liquid crystal as the optical shutter in combination with the polarizer and color filter, the display devices of this invention also feature a wide viewing angle, brightness, low power consumption, compact and large screens, low cost, and monochromic, dichroic, and full-color display. Also, the display devices of this invention offer high-quality images even in an adverse, e.g., dusty, environment because the core of its optical waveguide is not exposed and is free from foreign matter. Also, the display devices are flexible and easily bent mechanically because the transparent plate, optical waveguide, and clad portion, which are the main components of the image display unit of the display device, can be made of plastic. Thus, the display devices of this invention are light in weight and impact-resistant, and have a wide range of industrial applications that require display devices.

What is claimed is:

1. A display device comprising:
a first plate,
a paired optical waveguide comprising a first optical waveguide and a second optical waveguide,
a first transparent electrode, and
a second electrode which faces the first transparent electrode,
the second optical waveguide comprising an electroresponsive material formed between the first transparent electrode and the second electrode which face each other,
wherein at least one of the first optical waveguide and the second optical waveguide is formed in close contact with the first plate, and the first and second optical waveguides are disposed in close contact with or near each other so that light guided to the first optical waveguide is led to and leaks through the second optical waveguide, and
wherein the electroresponsive material is transparent against the guided light, but changes in form when voltage is applied between the first transparent electrode and the second electrode to thereby scatter the guided light of the second optical waveguide and emit the scattered light outside as pixels.

2. The display device according to claim 1, wherein the paired optical waveguide comprises groups of independent optical waveguides for two colors or three primary colors, so that the display device displays two colors or three colors by guiding the two colors or the three primary colors through the corresponding optical waveguides.

3. The display device according to claim 1, wherein light from a light source is guided to the paired optical waveguide through an optical waveguide integrated on the first plate.

4. The display device according to claim 1, wherein light from a light source is guided to the paired optical waveguide through an optical waveguide integrated on a second plate which is different from the first plate.

5. The display device according to claim 3, wherein part or a whole of a surface of the optical waveguide integrated on the first plate is covered with a reflection film.

6. The display device according to claim 3, wherein a first scattering material, a second light-scattering material, and a lens are provided in the optical waveguide integrated on the first plate so as to efficiently guide the guided light to the paired optical waveguide.

7. The display device according to claim 1, wherein a light source provides a guided light to the paired optical waveguide, and wherein said light source is a light-emitting diode or a laser diode.

8. The display device according to claim 1, wherein a light-emitting diode or a laser diode is integrally formed on the first plate or on a second plate which is different from the first plate.

9. The display device according to claim 1, wherein an external light source other than the display device is used to provide a guided light to the paired optical waveguide.

10. The display device according to claim 9, wherein light from the external light source is led to the optical waveguide integrated on the first plate, using an optical coupler having a rugged structure.

11. The display device according to claim 9, wherein a color filter is provided to change color of the guided light to a specific one.

12. The display device according to claim 4, wherein at least one of the first and second plates is made of plastic.

13. The display device according to claim 1, wherein the electroresponsive material is used as light-scattering liquid crystal.

14. The display device according to claim 1, wherein the electroresponsive material is gel which expands or shrinks when voltage is applied.

15. The display device according to claim 1, wherein electrochromic material is used as the electroresponsive material.

16. The display device according to claim 4, wherein part or a whole of a surface of the optical waveguide integrated on the second plate is covered with a reflection film.

17. The display device according to claim 4, wherein a first scattering material, a second light-scattering material, and a lens are provided in the optical waveguide integrated on the second plate so as to efficiently guide the guided light to the paired optical waveguide.

18. The display device according to claim 1, wherein a light-emitting diode or a laser diode is integrally formed on the first plate or on a second plate which is different from the first plate.

19. The display device according to claim 2, wherein light from a light source is guided to the paired optical waveguide through an optical waveguide integrated on the first plate.

20. The display device according to claim 2, wherein light from a light source is guided to the paired optical waveguide through an optical waveguide integrated on a second plate which is different from the first plate.

* * * * *